Oct. 8, 1940.  C. S. HAZARD ET AL  2,216,944
METER CONSTRUCTION
Filed Dec. 19, 1936
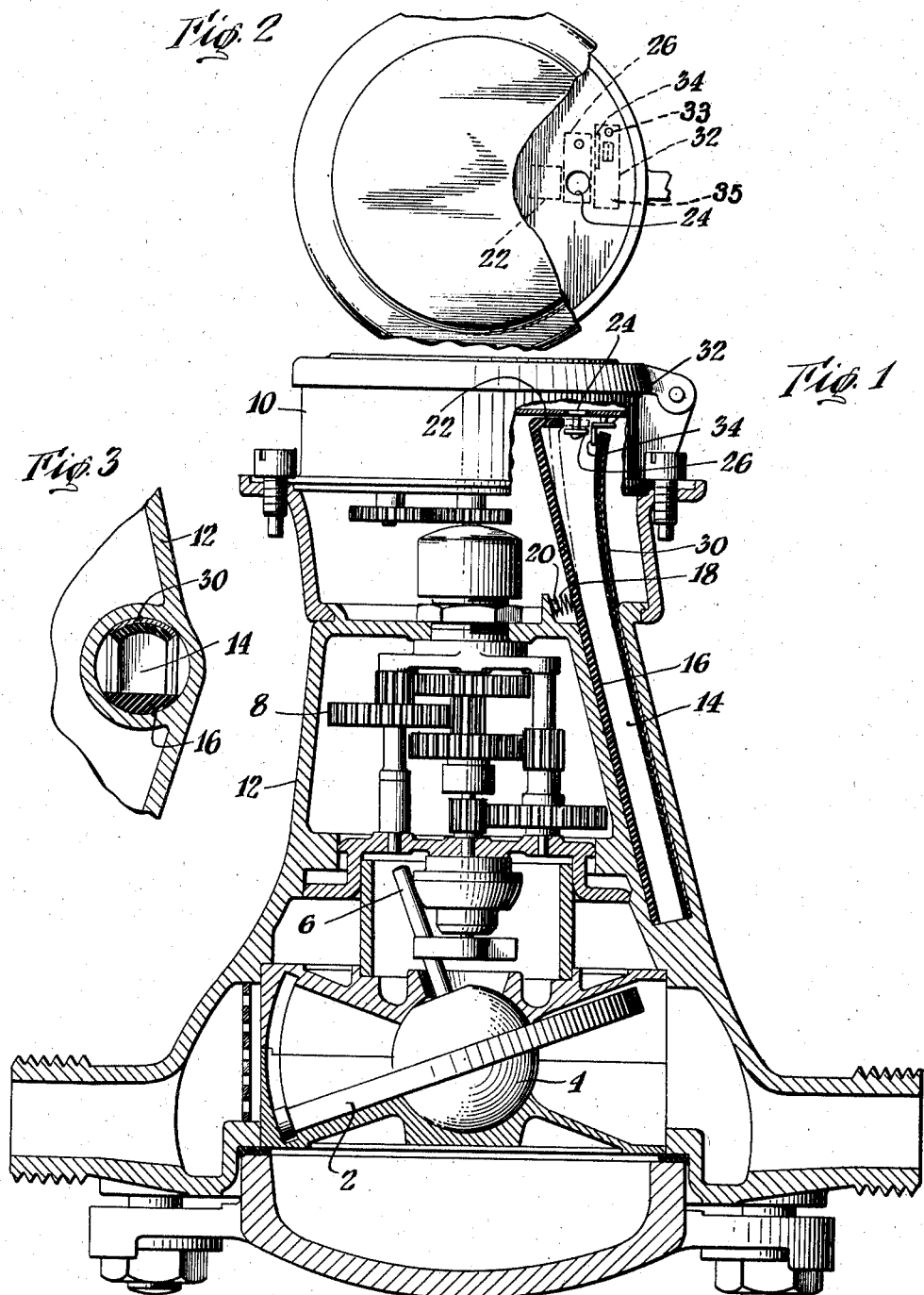
INVENTORS
*Charles S. Hazard*
BY *Joseph A. Hayes*
ATTORNEYS Patented Oct. 8, 1940

2,216,944

UNITED STATES PATENT OFFICE 2,216,944

METER CONSTRUCTION

Charles S. Hazard, New York, N. Y., and Joseph A. Hayes, Camp Hill, Pa., assignors to Neptune Meter Company, a corporation of New Jersey Application December 19, 1936, Serial No. 116,670

3 Claims. (Cl. 73—198)

This invention relates to metering devices such as water meters and the like, and particularly to constructions which are damaged when the parts thereof become overheated.

Meters of the nutating disk type such as are commonly used in water meters are frequently provided with a disk formed of hard rubber or of other material which may become warped or distorted if hot or even warm water is passed through the meter. In some constructions, other elements may also be injured or impaired by overheating. Such overheating may occur in very warm climates, or in the event a water heater is left turned on too long or when valves are improperly operated so that warm or hot water or steam is forced into the meter causing the disk to be warped or parts to be injured so that the meter will no longer operate or will only operate inaccurately.

If the disk is warped only slightly, it may still continue to operate but the meter will then register inaccurately. However, there will be nothing to indicate that there is any trouble or that hot water has passed through the meter.

In accordance with the present invention, means are provided for giving an indication when the meter has been overheated sufficiently to cause, or to tend to cause, the disk to become warped so that the meter may be inspected or removed and repaired to insure accurate measurement of the water or liquid passed.

One of the objects of the present invention is to provide a meter which is subject to injury when overheated with means adapted to be affected by heat detrimental to said meter to indicate when the meter has been overheated in its operation.

Another object of the invention is to provide a meter with an indicating device operable in response to temperature conditions which are capable of affecting the accuracy of meter operation to indicate either that the meter is, or that it has been overheated in operation.

A further object of the invention is to provide a meter with an indicating device and temperature responsive means for actuating said device to indicate the occurrence of a condition which may cause warping or injury to an element of the meter.

These and other objects and features of the invention will appear from the following description thereof in which reference is made to the accompanying figures of the drawing.

Figure 1 is a vertical sectional view of a nutating disk type of meter including an indicating device embodying the present invention;

Figure 2 is a plan view of the construction of Figure 1, partly broken away to indicate certain elements of the construction; and Figure 3 is a horizontal sectional view of a detail of the construction illustrating an alternative arrangement of the indicator actuating means.

In that form of the invention chosen for purposes of illustration shown in Figures 1 and 2 of the drawing, the device comprises a conventional type of nutating disk meter in which a disk 2, formed of hard rubber or other material which may become warped or distorted on overheating is carried by a spherical bearing member 4 and nutates with the bearing as water or other fluid is passed through the meter. The disk in nutating actuates the drive shaft 6 and gear train 8 to actuate registering elements within the casing 10. The gear train 8 is located within a housing 12 which, in operation, is filled with water or other fluid being measured, so that the walls of the housing assume the temperature of the fluid.

In accordance with the present invention, a chamber 14 is formed in the housing and in heat exchange relationship with the water or fluid being passed through the meter. As shown, the chamber 14 extends downwardly adjacent the gear train 8 within the housing, but the chamber may of course be located in any other suitable position and be formed in any desired shape for receiving heat from the water or liquid passing through the meter.

Within the chamber 14 is located an actuating member 16 which may be formed of hard rubber similar to that of which the disk 2 is formed or of any other suitable material which will be deformed or warped when heated. A spring 18 bears against a stud 20 on the top of the housing 12 for the gear train and against the actuating member 16 to urge the member 16 to the right as seen in Figure 1. Normally, the actuating member 16 is sufficiently rigid to retain the position shown in Figure 1 against the action of spring 18 so long as the meter is not overheated. However, on overheating of the liquid being measured the member 16 becomes sufficiently flexible to be warped by the heat received from the water and bends as shown in dotted lines in Figure 1 under the action of spring 20.

The upper end 22 of the member 16 projects laterally into a position adjacent sight opening 24 in the face of the meter dial or in any other desired location. Beneath the opening 24 and spaced below the same is a plate 26 which may be colored green or otherwise and is normally visible through the sight opening. However, on warping or bending of the member 16, the end 22 moves into position beneath the sight opening and above the green plate 26, concealing the same. The upper face of the end 22 may be red or otherwise marked to indicate that the meter has been subjected to conditions which tend to warp or distort the nutating disk and that such conditions have been prolonged sufficiently to render the meter inaccurate in its operation.

With the construction described, the green plate 26 is normally observed through the sight opening 24 indicating that the meter has not been subjected to any overheating. However, in the event the meter does become overheated by the passage of hot or warm water or steam therethrough, the desired warning will be given.

Since the disk 2 may be warped by momentary overheating due, for example, to a discharge of steam through the meter, it may be desired in some instances to provide a second actuating member 30 in the form of a bi-metallic strip or other temperature responsive means, which is more sensitive than the member 16 and may be actuated when overheating occurs only momentarily. In the construction shown, the actuating member 30 is formed so that the upper end thereof will be deflected to the left in Figure 1 upon an increase in temperature. A member 32 pivoted at 33 and having a downwardly turned lug 34 may be positioned adjacent the upper end of the actuating member so that upon movement of the upper end of the actuating member to the left the free end 35 of pivoted member 32 will be moved over the plate 26 to cover the same and indicate that a condition has occurred which may have injured or warped the disk 2 of the meter.

The pivoted member 32 is not secured to the actuating member so that when the temperature falls and the actuating member 30 again assumes the position indicated in Figure 1, the pivoted member will remain over the plate 26 preserving the warning indication so that the occurrence of even a momentary improper condition will be evident.

In that form of the invention illustrated in Figure 3 of the drawing, the actuating members 16 and 30 are shown as positioned at right angles to the positions thereof illustrated in Figure 1 of the drawing. This may be desirable in order that both of the actuating members may be subjected to a similar degree to the action of hot or warm water within the housing 12 for the gear train.

Cooling of the chamber 14 due to the conduction of heat through the walls of the housing 12 in the construction of Figure 3 will therefore have little or no effect upon the action of the device and the desired indication of the conditions which may have injured the disk 2, or which have caused improper operation of the meter, will be given.

The actuating means herein shown and described are typical of those which may be employed in the practice of the invention but it will be evident that other forms of temperature responsive actuating means than those described may be employed. It will also be evident that other means than the colored elements described may be actuated or employed to give a warning signal or alarm upon the occurrence of an improper condition. The invention therefore may be used in indicating the occurrence of undesired conditions in devices other than water meters. For this reason it should be understood that the forms of the invention herein illustrated and described are intended to be illustrative of the invention and are not intended to limit the scope thereof.

We claim:

1. In combination with a fluid meter having a metering element formed of material subject to injury when overheated, a temperature responsive element formed of the same kind of material as said metering element and located in heat exchange relation with fluid passing through the meter, and means actuated by said temperature responsive element to indicate a warning that the meter has been overheated.

2. In a fluid meter having a nutating disk formed of material which tends to become deformed when overheated; the combination of an element formed of material adapted to be permanently deformed upon being subjected to heat detrimental to said disk, said element being located in heat exchange relation with fluid passing in contact with said disk, a casing having a sight opening, and means operable to effect deformation of said element for movement into the view of said sight opening when said meter is overheated at a temperature and for a period of time sufficient to deform said disk.

3. A water meter having a casing, a nutating disk formed of hard rubber located in said casing and actuated by water passing therethrough, a member also formed of hard rubber located in heat exchanging relation with water passing through said casing, means tending to deform said member and a casing having a sight opening therein through which said member is visible only when deformed by said means.

CHARLES S. HAZARD.
JOS. A. HAYES.